Figure 1:
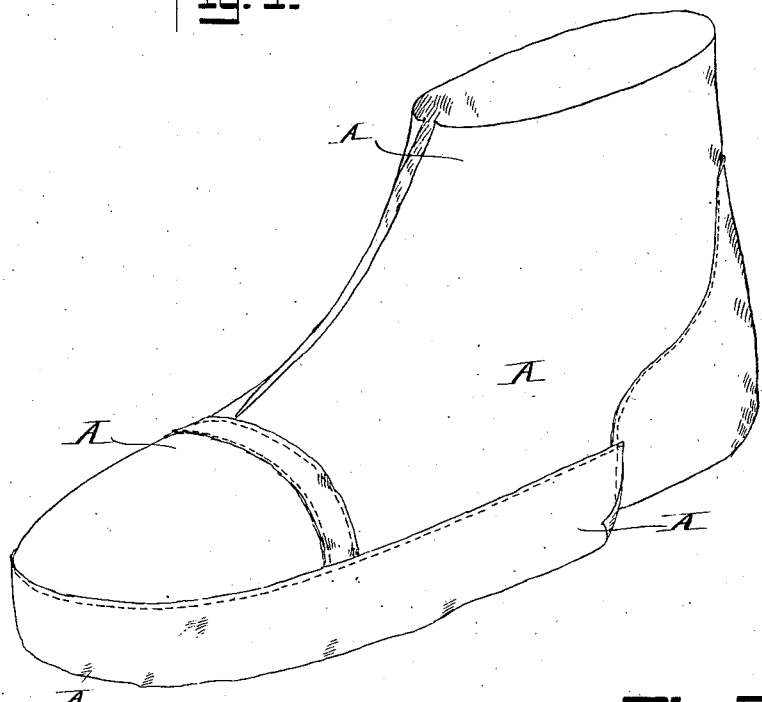

No. 848,807. PATENTED APR. 2, 1907.
M. C. CLARK.
PROCESS OF MAKING RUBBER FOOTWEAR.
APPLICATION FILED JUNE 20, 1906.

2 SHEETS—SHEET 1.

WITNESSES

INVENTOR
Maurice C. Clark
BY
ATTORNEYS

No. 848,807. PATENTED APR. 2, 1907.
M. C. CLARK.
PROCESS OF MAKING RUBBER FOOTWEAR.
APPLICATION FILED JUNE 20, 1906.

2 SHEETS—SHEET 2.

WITNESSES

INVENTOR
Maurice C. Clark
BY
ATTORNEYS

UNITED STATES PATENT OFFICE.

MAURICE C. CLARK, OF PROVIDENCE, RHODE ISLAND, ASSIGNOR TO MARVEL RUBBER COMPANY, OF PROVIDENCE, RHODE ISLAND, A CORPORATION OF RHODE ISLAND.

PROCESS OF MAKING RUBBER FOOTWEAR.

No. 848,807. Specification of Letters Patent. Patented April 2, 1907.

Application filed June 20, 1906. Serial No. 322,530.

*To all whom it may concern:*

Be it known that I, MAURICE C. CLARK, a citizen of the United States, and a resident of Providence, county of Providence, and State of Rhode Island, have invented certain new and useful Improvements in Processes of Making Rubber Footwear, of which the following is a specification.

The present invention relates to a certain novel and useful improvement in the process of manufacturing rubber footwear.

In the manufacture of rubber footwear by the usual method all the pieces employed except the upper and outsole are generally composed of some kind of textile material which has been coated with a rubber compound, either on one or both sides, by process commonly termed "calendering," which, as is well known, consists in applying the waterproof material to the surface of the fabric while passing the same in sheets through suitable calendering-machines. The piece is then cut into the necessary sections and of the right shape and size to conform and fit the last employed in making up the article. In cutting up the whole piece of rubber-coated fabric into the required shapes it will be evident that there must be considerable waste of material; and this waste, which in many instances is discarded, is commonly termed "scrap." In the manufacture of certain kinds of footwear this scrap amounts to as much as forty or fifty per cent. of the original piece or sheet. In addition to the loss or waste of the cloth alone the rubber compound of the fabric is rendered practically worthless, and the loss is therefore very great in proportion to the total value of the completed article. Furthermore, in the ordinary method of making rubber footwear the pieces usually joined together to form the completed article are the insole, the lining, the filling-sole, the upper, and outsole and such additional pieces as may be considered necessary and desirable to strengthen certain parts or to give durability and rigidity to the article, such pieces being usually counterpieces, rag soles, joining-strips, and the like. The maker first puts the rubber-coated insole upon the last and then the rubber-coated lining, which is lapped over the edge of the insole, just under the latter, and entirely around the shoe and is united to this insole by a rubber cement, the latter being pressed by the use of a hand-roller. Over this joint there is then placed a strip of cloth frictioned with a rubber compound which is rolled by the maker to strengthen the article at this point. A strip of rubber-frictioned cloth is also used to join the lining together at the back of the heel. Over this rubber-coated lining is then placed a sheet of rubber compound to form the upper and which is united to the plastic rubber compound forming the lining coating and carefully rolled by the maker. A half-sole composed of cloth frictioned with rubber compound is usually put on, covering the entire bottom of the shoe except at the extreme edge. Then the outsole of rubber compound is placed on the bottom of the shoe and carefully rolled down to cause it to properly unite with the upper and half-sole. All this work must be very carefully done, and the rubber compound must be in a substantially plastic state in order to unite, for as the pieces forming the shoe are necessarily stretched more or less out of their natural position when the article is placed in the vulcanizing-oven and heated the pieces are inclined to separate and form weak places in the shoe, as there is no mechanical pressure applied to hold the article against the last or support; but by the employment of my invention I find that a great saving of labor can be had and also a substantial saving in the amount of fabric and rubber compound necessary to make up the shoe.

The present invention consists in the construction, combination, and arrangement of parts and in the improved process set forth in and falling within scope of the appended claims.

In the accompanying drawings I have shown by way of illustration certain views which will assist in understanding the invention.

Figure 2:
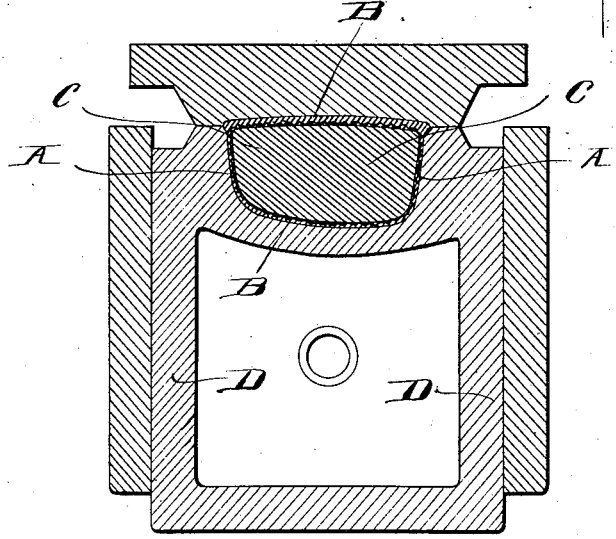
Figure 3:
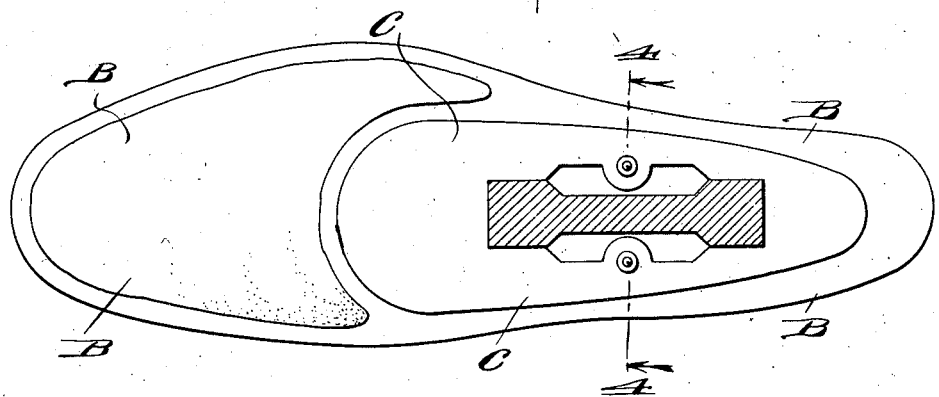
Figure 4:
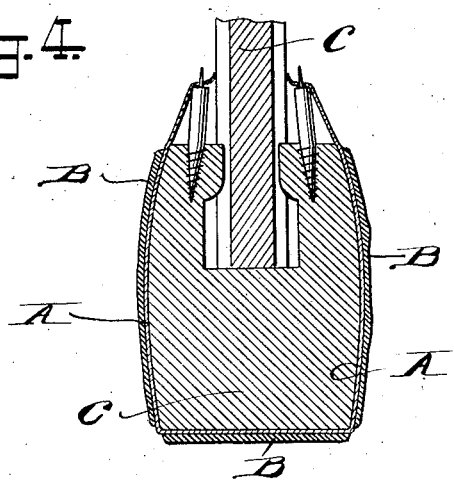

Figure 1 is a conventional view in perspective, showing the lining made up into a stocking and to which the rubber compound is adapted to be applied. Fig. 2 is a conventional view showing a transverse vertical section of a mold and the shoe therein and showing one means of applying pressure in the vulcanizing of the article. Fig. 3 is a top plan view of a last having the lining or stocking thereon and also indicating a section or sheet of rubber compound applied thereto, the stem or post of the last being shown in section. Fig. 4 is a cross-sectional view taken on the line 4 4 of Fig. 3, such view also showing the rubber compound applied to the stocking or lining.

In carrying out my invention instead of coating the fabric in the large sheet with a rubber compound, calendering same, and in general following out the method heretofore described I cut from a sheet of plain uncalendered fabric the necessary pieces required for the lining, the insole, and the like and sew all these pieces together, so that a complete lining or stocking such as is shown at A in Fig. 1 results. This is then placed upon the last, which is indicated at C. I then cut from plain sheets of rubber compound the proper shaped pieces required for the upper and sole of the article, and these pieces of sheeted rubber compound are placed over the fabric which is upon the last. In the drawings, B indicates the piece of rubber compound. When the shoe has been built up in this manner, it is placed in any suitable mold, such as indicated at D, and the steam-chambers of the mold are heated by any convenient means, so that the process of vulcanizing the shoe takes place. With the last forming a substantial support at the inside of the shoe and the heated molds pressing against the same on the outside the now soft or plastic compound is forced into the pores of the lining, and the molding and vulcanization of the shoe is completed. After the shoe has been in the mold a sufficient length of time to be completely shaped or molded it is removed therefrom and the shoe taken from the last in the form of a substantially finished article, all the pieces forming a perfect union and the entire waterproof coating being homogeneous.

The scrap-rubber compound left over after the sections have been cut therefrom can be used over again by calendering the same into sheets, therefore making absolutely no waste of the rubber compound and securing a great saving in the cost of the article.

As has been heretofore stated, in the ordinary method of making footwear the pieces where joined together are liable to separate in the process of vulcanizing, and to prevent this pieces of cloth covered with rubber compound, either coated or frictioned onto it, are used to strengthen the joined places, such as joining-strips, piping-strips, and the like. These pieces are costly, as they are covered with a very expensive rubber compound, and there is also considerable scrap or waste made in cutting them to the proper shape. By my process these pieces are not required, thereby attaining another great saving in the cost of producing the completed article.

Hitherto it has been proposed to manufacture articles of so-called "rubber-lined" and "fusion-lined" goods; but in all such instance the fabric used was first coated with rubber compound by the calendering or spreading process, in their case creating the waste of a large percentage of rubber compound in cutting to proper shapes required.

I believe myself to be the first to manufacture the waterproof article—such, for instance, as has been described—by cutting from the untreated textile material the necessary pieces of proper shape to form the lining, uniting the pieces, placing the article in this form upon a support, then placing thereon a sheet of unvulcanized rubber compound of required thickness, and then applying pressure to the article so built up to force the compound directly into the fabric forming the lining, so that the completed finished shoe is produced. Further, I wish it to be understood that I do not limit myself in this invention to footwear, as the invention is applicable to the maufacture of other articles without departing from the spirit thereof or exceeding the scope of the claims.

What I claim is—

1. The process of making rubber footwear which consists in uniting pieces of uncoated textile material to form a stocking or lining for the shoe, applying to the outer surface of this lining pieces of rubber compound and subjecting the article so built up to pressure between opposing surfaces to vulcanize the compound and force part of the same into the pores of the lining.

2. The process of manufacturing rubber footwear which consists in applying to a complete lining or stocking pieces of unvulcanized rubber compound, and subjecting the article so built up to pressure between opposing surfaces, certain of which are heated, to vulcanize the compound and force the same into the pores of the lining and simultaneously mold the complete article.

MAURICE C. CLARK.

Witnesses:
RICHARD B. CAVANAGH,
W. A. PAULING.